(12) United States Patent
Seh

(10) Patent No.: US 7,904,758 B2
(45) Date of Patent: Mar. 8, 2011

(54) SYSTEM, METHOD AND APPARATUS FOR TRACING SOURCE OF TRANSMISSION ERROR

(75) Inventor: Soon Seng Seh, Pulau Pinang (MY)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 11/907,109

(22) Filed: Oct. 9, 2007

(65) Prior Publication Data

US 2009/0094489 A1    Apr. 9, 2009

(51) Int. Cl.
*G06F 11/00* (2006.01)
*G06F 11/30* (2006.01)

(52) U.S. Cl. .................. 714/43; 714/4; 714/49

(58) Field of Classification Search ............... 714/4, 43, 714/49
See application file for complete search history.

(56) References Cited

U.S. PATENT DOCUMENTS

| | | | |
|---|---|---|---|
| 5,490,250 A * | 2/1996 | Reschke et al. ............. | 714/49 |
| 5,923,840 A * | 7/1999 | Desnoyers et al. ........... | 714/48 |
| 6,728,909 B1 * | 4/2004 | Bunton et al. .............. | 714/49 |
| 6,944,786 B2 * | 9/2005 | Kashyap .................... | 714/4 |
| 7,444,551 B1 * | 10/2008 | Johnson et al. ............. | 714/43 |
| 7,607,049 B2 * | 10/2009 | Yasuie et al. ............... | 714/43 |
| 7,738,366 B2 * | 6/2010 | Uddenberg et al. .......... | 370/229 |
| 2002/0157054 A1 * | 10/2002 | Shin et al. .................. | 714/748 |
| 2004/0153849 A1 * | 8/2004 | Tucker et al. ............... | 714/43 |
| 2008/0183921 A1 * | 7/2008 | Chang et al. ............... | 710/58 |

OTHER PUBLICATIONS

Wikipedia's Cyclic Redundancy Check version from Oct. 4, 2007 http://en.wikipedia.org/w/index.php?title=Cyclic_redundancy_check.*
About Port Multiplication by macgurus.com version from Feb. 20, 2006, found via the WayBackMachine http://web.archive.org/web/20060220222558/http://www.macgurus.com/productpages/sata/PortMultiplicationGuide.php.*

* cited by examiner

*Primary Examiner* — Scott T Baderman
*Assistant Examiner* — Joseph Schell
(74) *Attorney, Agent, or Firm* — Pearl Cohen Zedek Latzer, LLP

(57) ABSTRACT

A method and apparatus for identifying a device associated with a transmission error. The method generally comprising including a device identification information upon detection of a transmission error and further modifying an error check parameter according to a predefined rule.

9 Claims, 4 Drawing Sheets

SYSTEM, METHOD AND APPARATUS FOR TRACING SOURCE OF TRANSMISSION ERROR

BACKGROUND OF THE INVENTION

Port multipliers and other device multiplexing mechanisms allow a single port to be used for communicating with multiple devices, such as memory drives or peripheral devices. A port multiplier may allow cost-effective scalability in multi-device systems. If any errors are detected in transmission from any one of the devices to the port multiplier, for example, using cyclic redundancy check (CRC), the port multiplier is required to report such errors to the host controller. However, the standard does not provide for the port multiplier to report or differentiate to the host controller which device produced the error. Thus, typically, when an error is detected, either all devices attached to the port multiplier may be reset, or the status of the connected devices must be separately queried.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
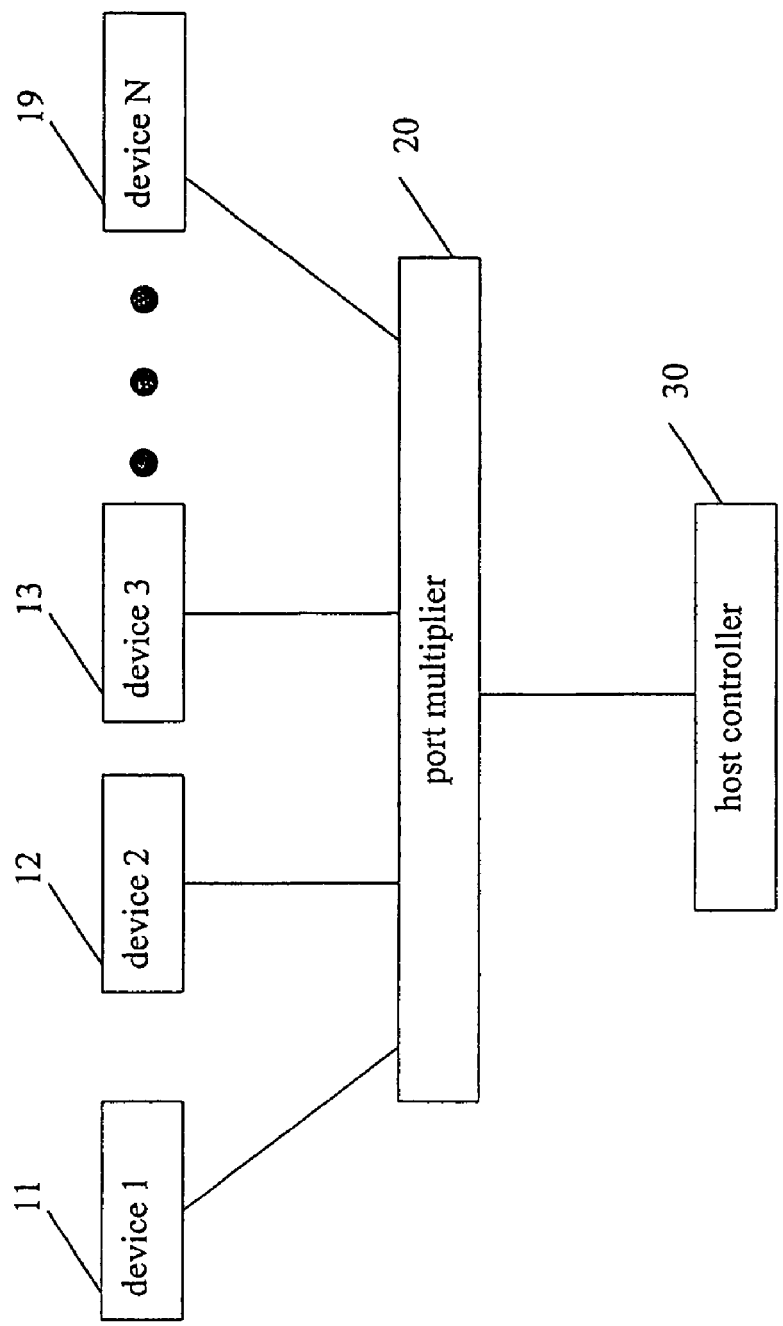
FIG. 1 shows a schematic diagram of a system including a plurality of devices connected to a host controller through a port multiplier according to embodiments of the present invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

A data process is here, and generally, considered to be a self-consistent sequence of acts or operations on data leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless explicitly stated, the method embodiments described herein are not constrained to a particular order or sequence. Additionally, some of the described method embodiments or elements thereof can occur or be performed at the same point in time.

A port multiplier may typically propagate error detection, such as cyclic redundancy check (CRC) error detection to upper layers, including the host controller, such as a serial ATA host controller. According to embodiments of the invention, an indication of data transmission error issued by a port multiplier may include a reference to the specific device that produced the error. Using such a reference, the host controller or a higher layer may be able to reset the specific faulty device rather than, for example, reset the entire subsystem, or initiate a procedure to detect the faulty device, such as querying all devices.

Reference is made to FIG. 1 showing a schematic diagram of a system according to embodiments of the present invention. The system shown in FIG. 1 includes a plurality of devices 11, 12, 13 and up to 19 connected to a host controller 30 through a port multiplier 20. According to some embodiments of the invention, devices 11, 12, 13 and 19 may be, for example, storage devices such as, but not limited to, floppy disks, optical disks, CD-ROMs, magnetic-optical disks or hard disks. According to some embodiments of the invention, devices 11, 12, 13 and 19 may be other peripheral devices, such as, but not limited to, network interface cards (NICs), or any other input/output devices.

According to some embodiments of the invention, devices 11, 12, 13, and 19 may compute an error check parameter for data communicated to port multiplier 20. For example, a CRC may be computed by these devices. The error check parameter may further be incorporated into data communicated by these devices to port multiplier 20.

According to some embodiments of the invention, port multiplier 20 may receive data and an error check parameter from one of devices 11, 12, 13, or 19. Port multiplier may further verify data integrity by calculating an error check parameter and by further comparing the calculated error check parameter to the received error check parameter. According to some embodiments of the invention, if port multiplier 20 detects an error in the received data, for example by discovering a mismatch between the received error check parameter and a calculated error check parameter then port multiplier 20 may apply a predefined modification to the calculated error check parameter. According to some embodiments of the invention, port multiplier 20 may incorporate a source device identification or a port number into the data communicated to host controller 30. According to some embodiments of the invention, port multiplier 20 may further incorporate an error check parameter into data communicated to host controller 30. According to some embodiments of the invention, if port multiplier 20 applied a modification to the error check parameter then port multiplier 20 may incorporate the modified error check parameter into the data communicated to host controller 30.

According to some embodiments of the invention, host controller 30 may receive data from port multiplier 20. Host controller 30 may calculate an error check parameter and compare it to a received error check parameter. According to some embodiments of the invention, if the error parameters do not show correspondence, host controller 30 may apply a predefined modification to the error check parameter it calculated, and if after the modification the error check parameters do correspond then host controller may deduce that data integrity was violated between one of devices 11, 12, 13, or 19 and port multiplier 20. According to some embodiments of the invention, the identification of the specific device or port from which data was received may be extracted by host controller 30 from data received from port multiplier 20. It will be understood that in the above, and throughout the present application, two numbers or parameters may correspond in a variety of ways, all intended to be included within the scope of the present invention. For example, correspondence may be shown by two numbers being equal, or otherwise matching, for example by a first number corresponding to or being equaling to a function of the second number, etc. Thus, for example, two numbers may correspond if they are equal, if one numbers equals an inverse of the other number, etc.

Figure 2:
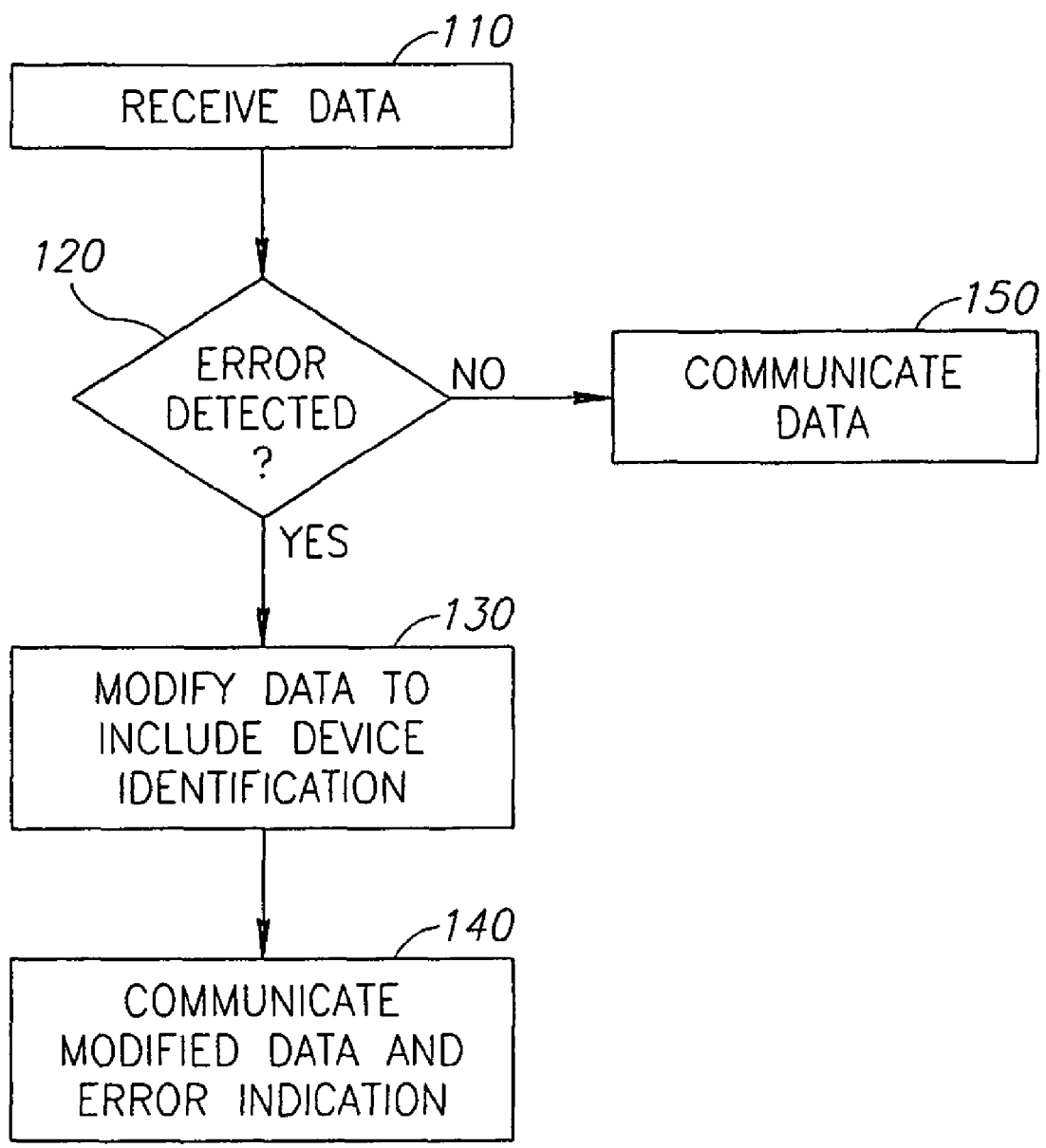
FIG. 2 shows a flowchart of a method according to embodiments of the invention.

Reference is now made to FIG. 2 showing an exemplary functional flowchart of a method performed at a port multiplier according to some embodiments of the invention. At 110 data may be received. For example, a port multiplier may receive data from one of a plurality of connected devices. At block 120 data may be checked for errors. For example, data integrity may be verified in order to discover possible errors, such as but not limited to, transmission errors or memory read and/or write errors. If no errors are found, then the data may be communicated (150), for example by a port multiplier to a host controller. According to some embodiments of the invention, if errors are found at block 120 then the data may be partially or entirely modified to include a device identification or a port identification as shown by block 130. Information such as device identification or port number may be readily available to a port multiplier, for example, different devices connected to a port multiplier are connected to separate, discrete ports in the port multiplier, thus a port multiplier may easily associate received data with a source device or a port number. The modified data may be communicated as shown by block 140, for example, by a port multiplier to a hosting platform. In some embodiments of the invention, the modified data may be communicated together with an error indication. According to some embodiments of the invention, an indication that data communicated at block 140 contains a device and/or port identification may be added to the transaction at block 140. At the hosting platform, the device identification or port number may be used in order to, for example, reset the relevant device or port.

Figure 3:
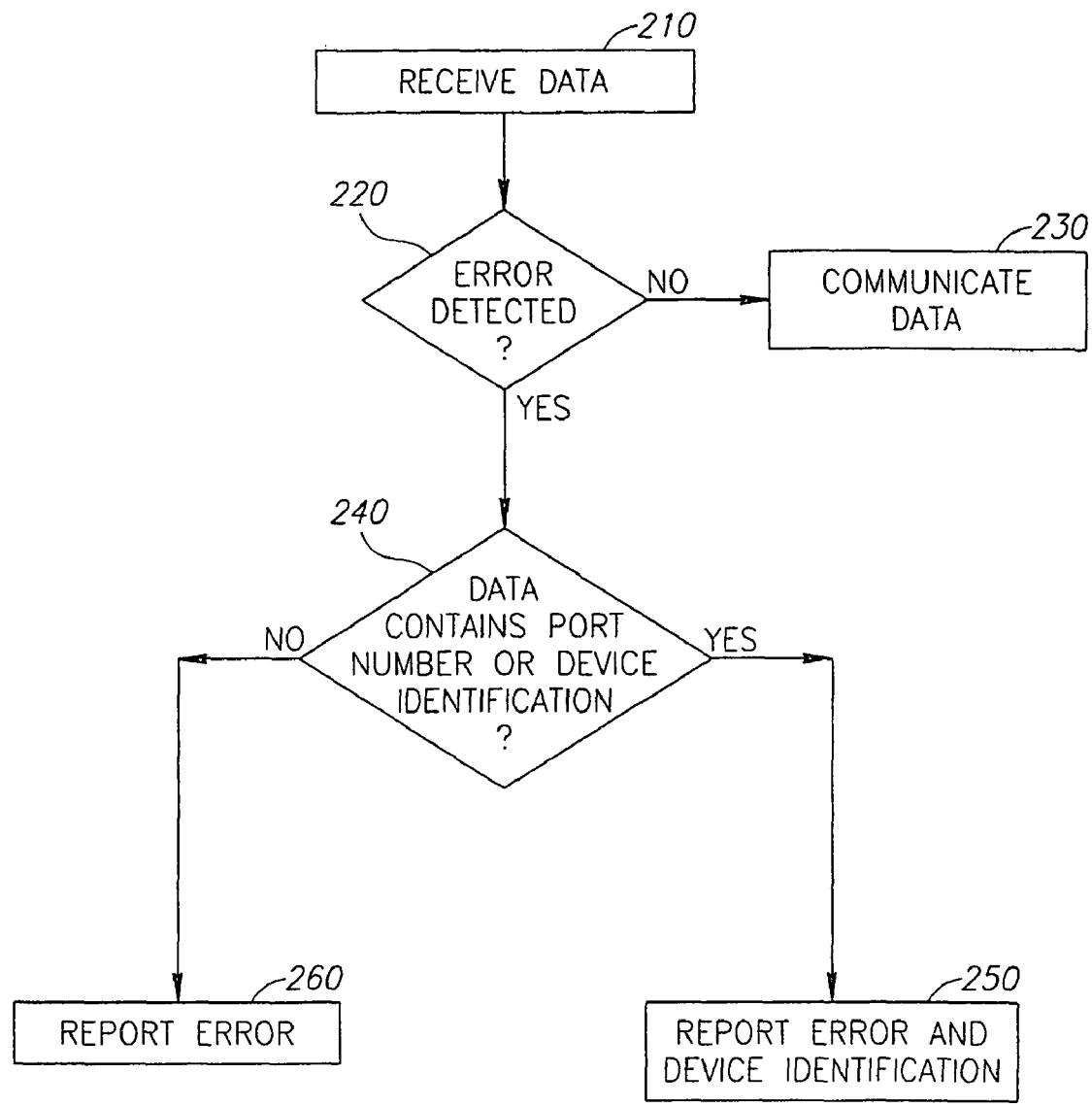
FIG. 3 shows a flowchart of a method according to embodiments of the invention.

Reference is now made to FIG. 3 showing an exemplary functional flowchart of a method performed at a host controller connected to a port multiplier according to some embodiments of the invention. At block 210 data may be received, for example by a host controller connected to a hosting platform data bus. In some embodiments of the invention, such controller may further be connected to a port multiplier. Such controller may receive data from a port multiplier at block 210. At block 220 data may be checked for errors such as but not limited to transmission errors and/or memory read and/or write errors. If no errors are found then data may be communicated as shown by block 230. For example, a host controller may communicate the data to a driver in the hosting platform or write the data to memory.

According to embodiments of the invention, if an error is detected at block 220, then at block 240 a check may be made in order to determine whether data received at block 210 contains a device identification and/or a port number or port identification. Such indication may have been provided by a port multiplier as described earlier. In some embodiments of the invention, if data received at block 210 contains a device and/or port identification, then such information may be extracted from the data and communicated to upper layers as shown by block 250, otherwise, an error indication with no specific device or port may be reported to upper layers as shown by block 260.

Figure 4:
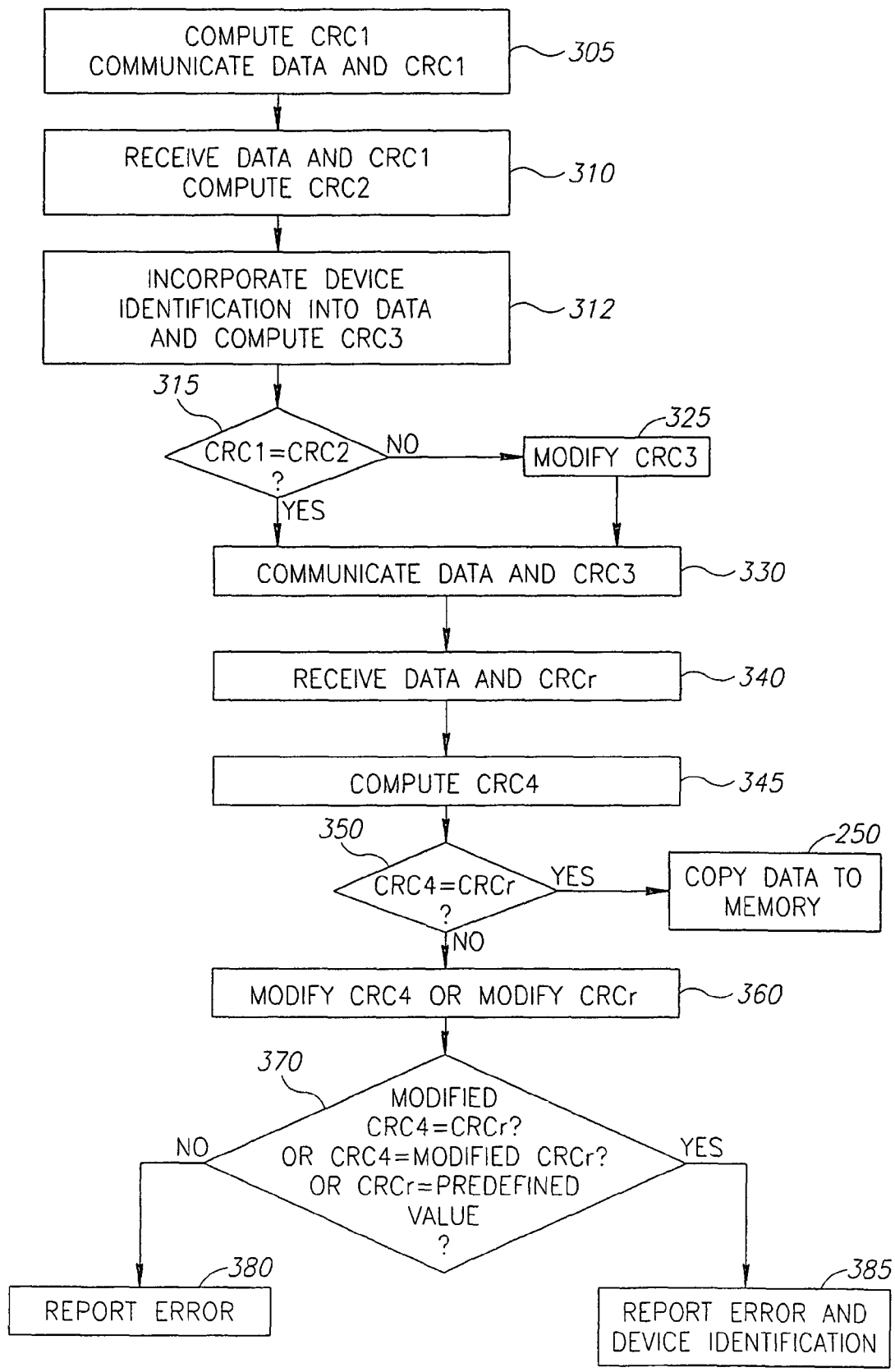
FIG. 4 shows a flowchart of a method according to embodiments of the invention.

Reference is now made to FIG. 4, showing a functional flowchart diagram illustrating an exemplary method using CRC according to some embodiments of the invention. According to embodiments of the invention, at block 310, data may be received from any one of a plurality of devices connected to a port multiplier. According to embodiments of the invention, an error checking function may be performed on the content data, and the error checking data included with the data communicated by a connected device. For example, part of the data sent may be used to check for errors, for example, by computing such datum by a sender of data, attaching the datum to the communicated data, computing a datum by a receiver of the communicated data and further comparing received datum to computed datum by a receiver. Error checking computation used in embodiments of the invention may include a redundancy check such as, but not limited to, cyclic redundancy check (CRC), checksum, parity bit value, check digits value, longitudinal redundancy check, horizontal redundancy check, vertical redundancy check, vertical redundancy check, cryptographic message or any other suitable function, for example, any suitable hash function. For simplicity, CRC will be used to exemplify embodiments of the invention, but it will be understood that the invention is not limited to CRC error checking, but rather any suitable error checking process may be used. Accordingly, a first CRC value, CRC1, may be computed by a connected device at block 305.

In some embodiments of the invention, the device performing the computation of CRC1 at block 305 may be any device suitable for connecting to a hosting platform, such as a memory device or a peripheral device. For example, the device may be a storage device such as a hard disk drive, or a removable storage media such as a non-volatile memory device, a compact disk (CD) drive, or the device may be a solid state storage device while data may be a portion of a file, or block of data being read, or data may be some configuration parameters pertaining to the device itself, or any other information stored therein. Data at block 305 may be, for example, read from a device by an application running on the hosting platform. In yet other embodiments of the invention, the device may be a network interface card (NIC) while data may be a packet received from a network.

According to embodiments of the invention, the type, configuration and other parameters pertaining to the receiving entity comprising the functionality shown by logical block 310 may vary and may depend on the hosting platform, connected devices, as well as configuration. According to some embodiments of the invention, the receiving entity comprising the functionality shown by logical block 310 may be a port multiplier, such as, but not limited to, advanced technology attachment (ATA) port multiplier, serial advanced technology attachment (SATA) port multiplier, serial advanced technology attachment II (SATA II) port multiplier, external serial advanced technology attachment (eSATA), or any other suitable port multiplier.

According to embodiments of the invention, at block 310 CRC2 of the received data may be computed. According to embodiments of the invention, the computation of CRC2 may be performed in the same fashion and/or according to the same scheme as the computation of CRC1. Consequently, if data integrity has been preserved, it may be expected that CRC1 will correspond to CRC2.

According to embodiments of the invention, information identifying the source of data may be incorporated into the received data as shown by block 312. For example, if the functionality shown by logical block 312 is performed by a port multiplier, then information identifying the device and/or port from which data was received at block 310 may be incorporated into the data received. According to embodiments of the invention, CRC3 may be computed for the modified data at block 312. According to the embodiments of the invention, the computation of CRC3 may be performed in the same fashion and/or according to the same scheme as the computation of CRC1 and CRC2.

In some embodiments of the invention, the port multiplier may calculate an error check parameter based on the data and the identity of the device that produced the data, for example, so that the error check may relate to the integrity of the entirety of data transmitted by the port multiplier to the host controller. It will be noted, however, that the invention is not limited in this regard, and the error check may be separately calculated on any single one or more components of the information transmitted by the port multiplier, e.g., the received data and the identity of the device.

According to embodiments of the invention, CRC1 and CRC2 may be compared as shown by block 315. According to some embodiments of the invention, if CRC1 corresponds to CRC2 then it may be assumed that data integrity has been preserved during transmission from block 305 to block 310. In such case, data may be communicated with newly computed CRC3 as shown by block 330. According to embodiments of the invention, communication of the data and CRC3 as shown by block 330 may be from a port multiplier to a hosting platform.

According to embodiments of the invention, if CRC1 does not correspond to CRC2 at block 315 then it may be presumed data integrity has been violated between block 305 and block 310. In such case, according to embodiments of the invention, CRC3 may be modified at block 325 according to a predefined rule. According to some embodiments of the invention, modification of CRC3 may be reversible. For example, CRC3 may be modified at block 325 by bit inversion, namely, by inverting its binary representation such that all 1's are replaced by 0's and all 0's are replaced by 1's. According to other embodiments of the invention, CRC3 may be modified, or derived, at block 325 by an irreversible function. For example, CRC3 may be assigned a constant value, e.g. 0 (zero) or −1 (minus one). As will be described below, such predefined values may be interpreted, for example by a receiving entity of CRC3 as an indication that data integrity violation has been detected at block 315 and possibly, further, that a device identification has been incorporated into the data. According to embodiments of the invention, the modified CRC3 may be communicated with the data as shown by block 330.

According to embodiments of the invention, communicated data and a CRC from block 330 may be received at block 340. Accordingly, the CRC received at block 340 may be either a modified CRC3 or an unmodified CRC3. For reference purposes, the CRC received at block 340 will be denoted CRCr hereafter.

According to embodiments of the invention, CRC4 for the data received at block 340 may be computed as shown by block 345. According to embodiments of the invention, CRC4 may be computed in the same fashion and/or according to the same scheme as the computation of CRC1 and/or CRC2. CRC4 may further be compared with CRCr at block 350.

According to some embodiments of the invention, if CRC4 is found to correspond to CRCr at block 350 then it may be presumed data integrity has been preserved. Further actions may comprise, for example, copying of data to its destination memory within a hosting platform, and/or notifying an application of the arrival of new data (335).

According to some embodiments of the invention, if CRC4 is found to be different from CRCr at block 350 then CRC4 may be modified at block 360. According to some embodiments of the invention, modifications applied to CRC4 may be the same as those applied to CRC3 at block 325. In other embodiments of the invention, instead of modifying CRC4 at block 360, CRCr may be modified in a manner that reverts the modifications applied to CRC3, possibly at block 325. For example, if bit inversion was used to modify CRC3 at block 325 then applying bit inversion to CRCr may revert its value back to the value of CRC3 before the modification at block 325. In other embodiments of the invention, if CRC4 is found to be different from CRCr at block 350 then the value of CRCr may be compared to a predefined value, for example 0 (zero) or −1 (minus one).

According to some embodiments of the invention, if CRC4 was modified at block 360 then modified CRC4 may be compared to CRCr at block 370. If CRCr was modified at block 360, then modified CRCr may be compared to CRC4 at block 370. If the compared CRC's are found to correspond at block 370, or CRCr corresponds to a predefined value as described above, it may be presumed that data integrity has been violated between block 305 and block 310. For example, between a source device and a port multiplier. Further action may comprise retrieving device identification and/or port identification or number that may have been incorporated into the data at block 312 and possibly informing upper layers of both the error and the identification of the device as shown by block 385. According to embodiments of the invention, upper layers, or the layer performing the functionalities comprising the functionality of block 370 may use the device and/or port identification in order to, for example, reset the specific device or port, as well as possibly collect statistics.

According to some-embodiments of the invention, If the compared CRC's are found to be different at block 370 it may be presumed that data integrity has been violated between block 335 and block 340. For example, between a port multiplier and a controller at the hosting platform. Further action may comprise informing upper layers of the error as shown by block 380.

In some embodiments of the invention, the entity performing the functionalities from block 340 through block 385 may be a controller attached to a hosting platform bus. For example, a port multiplier enabled controller, such as but not limited to, a controller supporting command-based switching or a controller supporting frame information structure (FIS), or any other suitable controller or device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   receiving input data and a first error check parameter pertaining to said input data;
   computing a second error check parameter pertaining to said input data;
   performing an error check on said input data;
   if an error is detected in said input data, modifying at least one of said first error check parameter and said second error check parameter, and if said parameters correspond, extracting information pertaining to an identification of a source device from said input data, wherein said modification of said error check parameter is performed by assigning predefined value to said error check parameter; and
   communicating said input data and said extracted information.

2. The method of claim 1, further comprising if no error is detected in said input data, communicating said input data.

3. The method of claim 1 wherein performing said error check comprises comparing a received parameter pertaining to an error check of said input data to a computed parameter pertaining to an error check of said input.

4. The method of claim 1 wherein performing said error check comprises comparing a received cyclic redundancy check (CRC) value to a computed cyclic redundancy check (CRC) value.

5. The method of claim 1 further comprising:
   receiving said communicated input data and receiving said error check parameter pertaining to said communicated input data;
   computing an error check parameter pertaining to said received data; and
   if said received error check parameter is different from said computed error check parameter, modifying said computed error check parameter according to a predefined rule, and, if said modified computed error check parameter corresponds to said received error check parameter, extracting said identifier from said communicated data.

6. A computer system comprising:
   a port multiplier to receive data from each of a plurality of devices, to perform an error check on said received data by computing a port multiplier error check parameter pertaining to said received data, wherein if an error is detected by said port multiplier in said received data, said port multiplier communicates a modified port multiplier error check parameter, wherein said modified port multiplier error check parameter includes information pertaining to an identification of the device from which said data was received, wherein said modified port multiplier error check parameter is derived by replacing said port multiplier error check parameter with a predefined value.

7. The system of claim 6, further comprising a host controller connected to said port multiplier to receive data and said modified port multiplier error check parameter from said port multiplier, to perform an error check on said received data by computing a host controller error check parameter pertaining to said received data, wherein if an error is detected by said host controller, said host controller is to determine whether said error occurred between said port multiplier and said host controller or between one of said plurality of devices and said port multiplier.

8. The system of claim 7, wherein if an error occurred between one of said plurality of devices and said port multiplier, said host controller is further to determine from which of said plurality of devices said port multiplier received the data including the error.

9. The system of claim 6 wherein said error check is performed by comparing a received cyclic redundancy check (CRC) value to a computed cyclic redundancy check (CRC) value.

* * * * *